United States Patent [19]

Frayer

[11] Patent Number: 4,639,485
[45] Date of Patent: Jan. 27, 1987

[54] CO-SOLVENT ACCELERATOR FOR CONVERSION OF POLYAMIDE-ACID SOLUTION TO POLYIMIDE

[75] Inventor: Paul D. Frayer, Brooklyn, Conn.

[73] Assignee: Rogers Corporation, Rogers, Conn.

[21] Appl. No.: 760,899

[22] Filed: Jul. 31, 1985

[51] Int. Cl.$^4$ ............................ C08J 3/02; C08K 5/04
[52] U.S. Cl. .................................... 524/378; 524/600; 524/104
[58] Field of Search ................. 524/378, 600; 524/104

[56] References Cited

U.S. PATENT DOCUMENTS 4,115,341 9/1978 Boldebuck et al. ................. 524/378

Primary Examiner—Lucille M. Phynes
Attorney, Agent, or Firm—Fishman & Dionne

[57] ABSTRACT

A co-solvent accelerator for a polyamide-acid/ether solution which accelerates the conversion thereof to polyimide is presented. The co-solvent accelerator comprises high boiling pyrrolidone-based solvents, especially those with a boiling point of above about 250° C. such as N-cyclohexyl-2-pyrrolidone (CHP). Said co-solvents are employed in concentrations of from about 0.5% to about 10% by weight, preferably 3% to about 10%.

6 Claims, No Drawings

CO-SOLVENT ACCELERATOR FOR CONVERSION OF POLYAMIDE-ACID SOLUTION TO POLYIMIDE

BACKGROUND OF THE INVENTION

This invention relates to a co-solvent accelerator for a polyamide-acid solution which accelerates the conversion thereof to polyimide. Such polyimides include homopolymers and copolymers such as polyamide-imides, polyester-imides, polyimide amide-imides and the like as well as blends of such polyimides.

Polyimides find wide use and applicability due, in part, to their relatively high heat resistance. It is well known that polyimides can withstand brief exposure to soldering conditions involving temperatures of between 270°–290° C. Moreover, polyimides can usually be used in environments having continuous temperatures of up to about 260° C. so long as they have been properly heat treated.

Typically, condensation polyimides are made from polyamide-acids dissolved in a solvent. While the solvents aid fabrication of films or adhesive coatings, unfortunately, the commonly used solvents will boil at about 150°–200° C. Therefore, unless adequately removed, residual solvent may evolve during and after fabrication (i.e., at temperatures at or above 150°–200° C.) which may cause defects such as voids, adhesive failure, and undesirable dimensional changes (shrinkage or distortion). For example, this residual solvent may undesirably evolve during soldering or other high temperature applications. Consequently, rigorous drying for long times and/or high temperatures (often to at least 300° C.) typifies the prior art. Also, pressure uniformity is a problem when manufacturing polyimide bonded laminates near 300° C., especially for large areas (i.e., 100 or more square inches) in size. Unfortunately, typical compressible press pads with smooth surfaces, e.g., silicone rubber, cannot withstand the 300° C. heat while glass mats leave undesirable visible indentations in the laminate surface. Thus, it is advantageous to lower the required bonding temperature for making laminates.

Other problems are also well known to those in the art familiar with the polyamide-acid solution conversion to polyimide. For example, the rate of reaction at lower temperatures (i.e., the processing time) is undesirably long. U.S. Pat. No. 3,410,826 discloses the use of dehydrating agents to accelerate the conversion of polyamide-acid to polyimide. However, such agents were found to "produce a substantial proportion of polyisoimide" which "changes readily to the normal polyimide upon heating to a temperature of at least 300° C.". Nevertheless, this patent represents the only method known to the inventors herein for fast conversion of a polyamide-acid to polyimide, i.e., in minutes instead of hours. No plasticizer is used in the method taught by this patent.

U.S. Pat. No. 3,449,193 discloses a method for bonding two "barrier layers" (e.g., a polyimide film to copper foil) using a "polyamic acid" adhesive. This disclosure emphasizes the need to balance the relative rates of solvent removal and reaction which occur simultaneously. A time-consuming step, called the "post cure" set forth in the patent, requires an increase in temperature at a slow rate from about 250° F. to 450° F. with said exposure continuing for a period from between 3 to 8 hours. According to the patent, this is sufficient to cure the polyimide (amide) adhesive and to remove any residual solvent which, if not removed prior to exposure to an elevated temperature, may cause a failure to develop in a bonding area.

Accordingly, it is an object of the present invention to provide a processing co-solvent having a sufficiently high boiling point so as to prevent any evolution thereof during and after fabrication.

It is another object of the present invention to provide a processing co-solvent which will lower the required bonding temperature for making laminates.

It is still another object of the present invention to provide a processing co-solvent which will act as a reaction accelerator at lower processing temperatures thereby increasing the rate of conversion to polyimide.

It is yet another object of the present invention to provide a processing co-solvent which will increase the rate of removal of the lower boiling point solvent.

The above and other objectives and advantages of the present invention will be more readily understood when considered in light of the following discussion.

Until recently, polar aprotic (i.e., lacking active hydrogen atoms) solvents (employed individually) were commonly used during the conversion of polyamide-acids to polyimides. Typical examples included dimethylformamide (DMF b.p. 153° C.), dimethylacetamide (DMAc b.p. 165° C.), dimethylsulfoxide (DMSO b.p. 189° C.), and N-methyl-2-pyrrolidone (NMP b.p. 202° C.) However, most such solvents were found to emit toxic fumes above their boiling point.

More recently, less toxic ethers were disclosed as solvents which volatilize more readily than the typical more polar solvents. For example, U.S. Pat. No. 4,065,345 describes a method for making polyimide adhesive joints using an ether solvent.

In U.S. Pat. No. 4,094,862, a process is claimed and disclosed which uses polar solvents such as dimethylformamide (DMF) or N,N-dimethylacetamide (DMAc) for making a thermoplastic polyimide film without voids and which can be further processed (i.e., caused to flow with heat and pressure) above its glass transition temperature, typically greater than 250° C. The total processing time exceeds about four hours.

It will be appreciated that all of the heretofore discussed prior art involves polyamide-acid to polyimide conversion reactions which utilize a single solvent base. In accordance with the present invention, it has been unexpectedly discovered that the addition of a high boiling point pyrrolidone-based solvent to the predominately ether solvent based poly amide-acid solution greatly increases the rate of conversion to polyimide and increases the rate of removal of the lower boiling point solvent (i.e., the ether) without foaming or blistering. Thus, the present invention comprises a co-solvent accelerator which also has a sufficiently high boiling point so as to prevent any evolution thereof during and after fabrication. The co-solvent accelerator of the present invention also permits lower fabrication temperatures during, for example, the bonding of laminates. Accordingly, unlike the prior reaction systems, the present invention provides for a two-solvent system.

The co-solvents which have thus far been found capable of providing the above unexpected and desirable results include and the pyrrolidone-based solvents such as N-cyclohexyl-2-pyrrolidone (CHP) which has a normal boiling point well above 250° C.

It should be understood that in the present invention, the term polyimide is meant to include homopolymers and copolymers such as polyimide-imides, polyamide-imides, polyester-imides, polyimide-amide-imides and the like as well as blends of such polyimides.

Further, it has been found that the amount of high boiling point solvent accelerator to be used should be from about 0.5% to about 10% by weight, preferably from about 3% to about 10% and more preferably 5% to about 10%.

The high boiling point, polar aprotic solvent CHP is preferred for use in this invention because it also serves as a low volatility, high temperature processing aid. See co-pending U.S. application Ser. No. 550,784 filed on Nov. 14, 1983, now abandoned, in favor of continuation-in-part application Ser. No. 728,480 filed on Apr. 29, 1985, both of which are assigned to the assignee hereof and incorporated herein by reference. CHP is preferred because of its higher boiling point and its desirable plasticizing effect during subsequent fabrication operations.

The following examples are given to further illustrate the present invention.

As will be shown below, it was found that adding more than the stoichiometric amount of, for example, 1 CHP molecule per initial (amide-acid) group is unnecessary and wasteful since any excess at any given set of reaction times and temperatures is simply lost by evaporation. The quantity of high boiling point co-solvent accelerator remaining after polyimide conversion depends on the processing conditions more than on the initial quantity added, especially for CHP in the preferred range of 5 to 10%. The quantity of co-solvent accelerator remaining tends to be self-limiting because of its inherent low volatility. This self-limiting phenomenon is also present because the high glass transition temperature polyimide that is formed further reduces its mobility. Finally, because the diffusion of interacting solvent molecules in a polymer is concentration dependent, the diffusion rate of the co-solvent decreases as the concentration decreases.

Tables 1 and 2 quantify the effect of CHP on solvent loss and conversion to polyimide under isothermal conditions is determined by standard infrared spectroscopic methods.

Thus, Table 1 shows % solvent loss and % conversion without the addition of a co-solvent accelerator while Tables 2 show % solvent loss and % conversion for 10% CHP respectively in accordance with the present invention.

TABLE 1

| Sample and Conditions THF/DIGLYME | | | % SOLVENT LOSS | % CONVERSION |
|---|---|---|---|---|
| 1. | 85° C. | 20 min. | 00.0 | 2.0 |
| 2. | 155 | 24 | 24.0 | 20.2 |
| 3. | 155 | 120 | 37.0 | 35.8 |
| 4. | 165 | 12 | 31.7 | 26.0 |
| 5. | 165 | 30 | 40.0 | 23.3 |
| 6. | 175 | 6 | 43.4 | 41.2 |
| 7. | 175 | 15 | 53.4 | 48.4 |

TABLE 2

| 10% CHP | | | % Solvent Loss | % Conversion |
|---|---|---|---|---|
| 8. | 85° C. | 20 min. | 00.0 | 2.0 |
| 9. | 155 | 24 | 56.4 | 73.6 |
| 10. | 155 | 120 | 70.0 | 86.2 |
| 11. | 165 | 12 | 60.1 | 80.3 |
| 12. | 165 | 30 | 68.0 | 85.5 |

TABLE 2-continued

| 10% CHP | | % Solvent Loss | % Conversion |
|---|---|---|---|
| 13. | 175 6 | 59.1 | 78.7 |
| 14. | 175 15 | 70.0 | 88.2 |
| | (Repeat Run) | 69.5 | 91.5 |

Table 3 is presented herein to demonstrate the effect of the co-solvent accelerators on conversion of polyamide-acid to polyimide under non-isothermal, constant heating rate conditions. In these experiments, samples were simultaneously analyzed by IR while heating them through the temperature range of 90°–300° C. (200°–570° F.). Without the more polar solvent, the conversion to the polyimide in the ether solvent is slow below about 175° C. (347° F.). Since all samples approach 100% as the theoretical upper limit, differences between the samples naturally become smaller at higher temperatures. The lower conversion at the faster heating rate may reflect more loss of the solvent relative to the rate of reaction, i.e., loss of the plasticizing effect on the reaction.

TABLE 3

| | % Conversion to Polyimide By IR Heating Rate/Composition of Co—Solvent | | | | | |
|---|---|---|---|---|---|---|
| | 4° F./min. | | | 10° F./min. | | |
| Temp. °F. | None | 10% CHP | Time Min. | None | 10% CHP | Time Min. |
| 200 | 2.0 | 2.0 | 0 | 2.0 | 2.0 | 0 |
| 250 | 2.0 | 3.5 | 12.5 | 2.0 | 9.0 | 5 |
| 300 | 3.7 | 18.8 | 25 | 2.0 | 16.5 | 10 |
| 350 | 8.7 | 30.7 | 37.5 | 3.1 | 30.5 | 15 |
| 400 | 24.8 | 57.8 | 50 | 14.3 | 40.4 | 20 |
| 450 | 44.0 | 80.2 | 62.5 | 35.3 | 66.2 | 25 |
| 500 | 67.7 | 91.6 | 75 | 62.6 | 85.7 | 30 |
| 550 | 89.1 | 93.4 | 87.5 | 81.2 | 96.4 | 35 |
| 570 | 93.8 | 94.2 | 100 | 87.0 | 98.5 | 40 |

NONE = NO Co—solvent accelerator

In the non-isothermal, constant heating rate experiments, it was noticed that the films without CHP turned yellow in color, after heating to 300° C. With CHP, the films were nearly colorless, definitely lacking the yellow color which in polymers is often indicative of oxidative degradation. It is speculated that the CHP protects the unreacted amide-acid groups from hydrolysis followed by oxidation because the CHP interacts so strongly. CHP may assist the diffusion of the water of reaction out of the polymer, thereby limiting hydrolysis.

As will be noted from the above examples and tabular data, the polar aprotic co-solvents of the present invention act to accelerate the conversion of polyamide-acid/ether solution at lower temperatures. Moreover, the preferred co-solvents have a high boiling point (i.e., over about 250° C.) so that the lower boiling ether solvent may be more easily removed during the conversion process. It should be understood that the polar aprotic co-solvent will continue to accelerate the thermal conversion to polyimide even beyond the boiling point of the main ether solvent and the removal thereof.

It should also be appreciated that relatively fast rates of heating may be employed without foaming or blistering using the high boiling point co-solvent of the present invention. It has been found that the co-solvent accelerator will cause the rate of reaction to exceed the particular heating rate employed. Accordingly, only equipment limitations will restrict the attainable heating rate.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A co-solvent for a polyimide-acid ether solution for accelerating the conversion of said solution to polyimide and permitting rapid removal of the ether solvent, said co-solvent comprising:
   polyamide-acid solution;
   ether solvent; and
   a pyrrolidone based polar aprotic solvent, wherein said ether solvent and said pyrrolidone based polar aprotic solvent form a co-solvent mixture with said polyamide-acid solution whereby the conversion of said polyamide-acid to polyimide is accelerated along with rapid removal of ether solvent from said polyamide-acid solution.

2. The co-solvent of claim 1 wherein said pyrrolidone based solvent is N-cyclohexyl-2-pyrrolidone.

3. The co-solvent of claim 1 wherein:
   said presence thereof is in an amount of from about 0.5% to about 10% by weight.

4. A method of accelerating the conversion of polyamide-acid/ether solution to polyimide and rapidly removing the ether solvent therefrom comprising the steps of:
   combining a pyrrolidone based polar aprotic solvent with said polyamide-acid/ether solution; and
   heating said combined solution.

5. The method of claim 3 wherein said pyrrolidone based solvent is N-cyclohexyl-2-pyrrolidone.

6. The method of claim 3 wherein:
   said presence thereof is in an amount of from about 0.5% to about 10% by weight.

* * * * *